Aug. 29, 1967     J. SWENDSEN     3,338,491
COARSE AND FINE ADJUSTMENT CONTROL FOR STRIP FEEDERS
Filed June 17, 1965     4 Sheets-Sheet 1
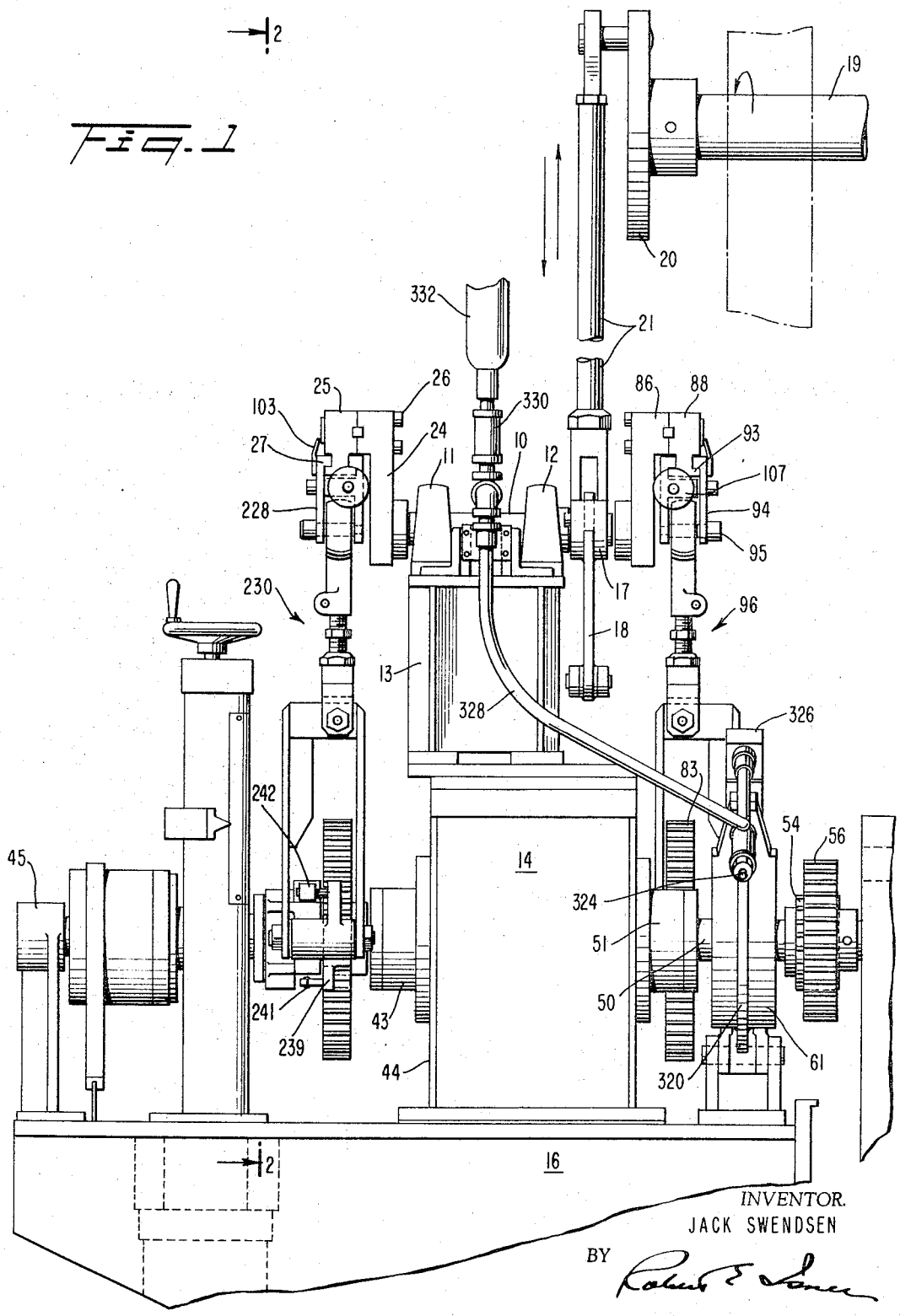
Fig.1
INVENTOR.
JACK SWENDSEN
ATTORNEY

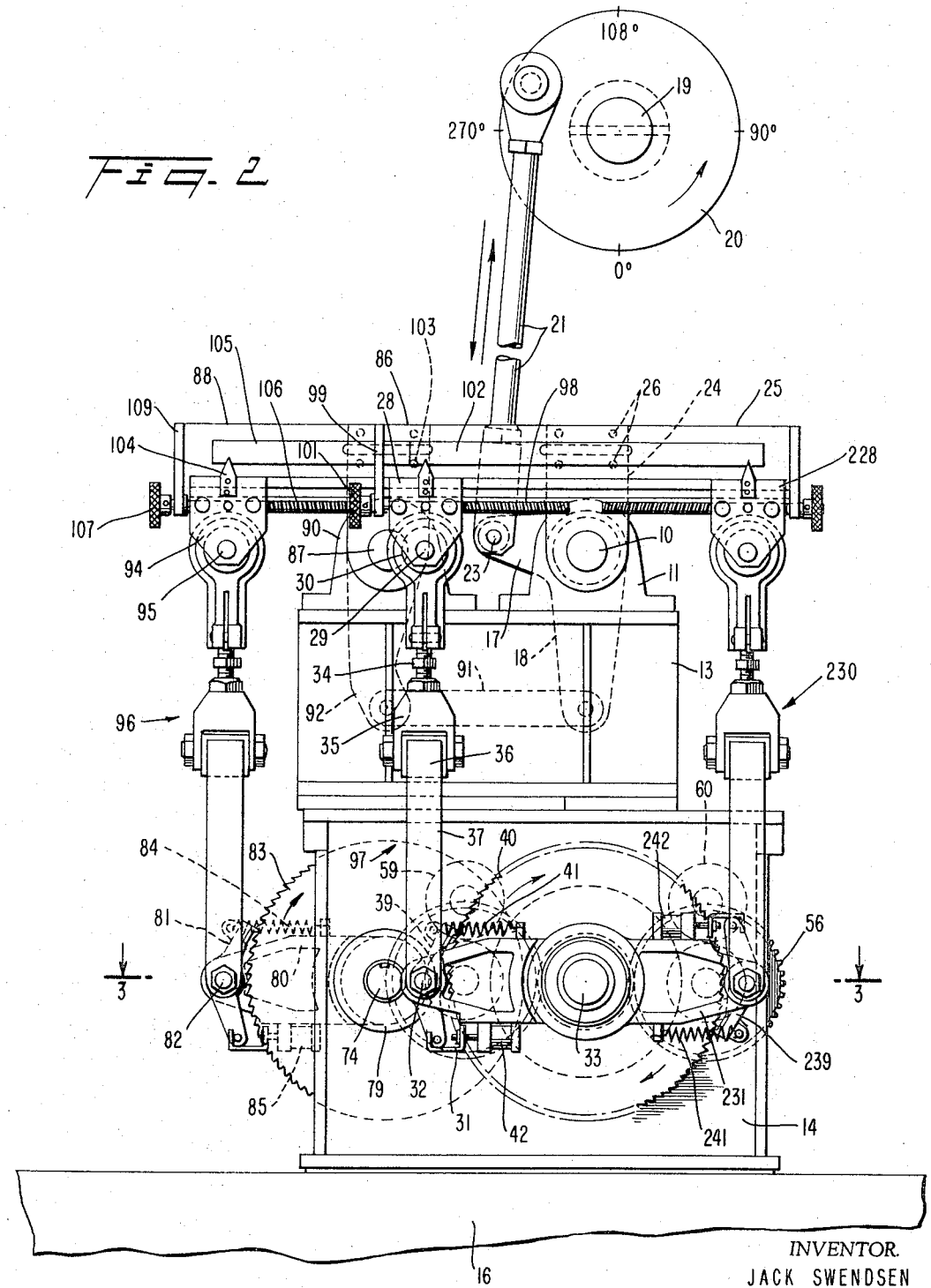

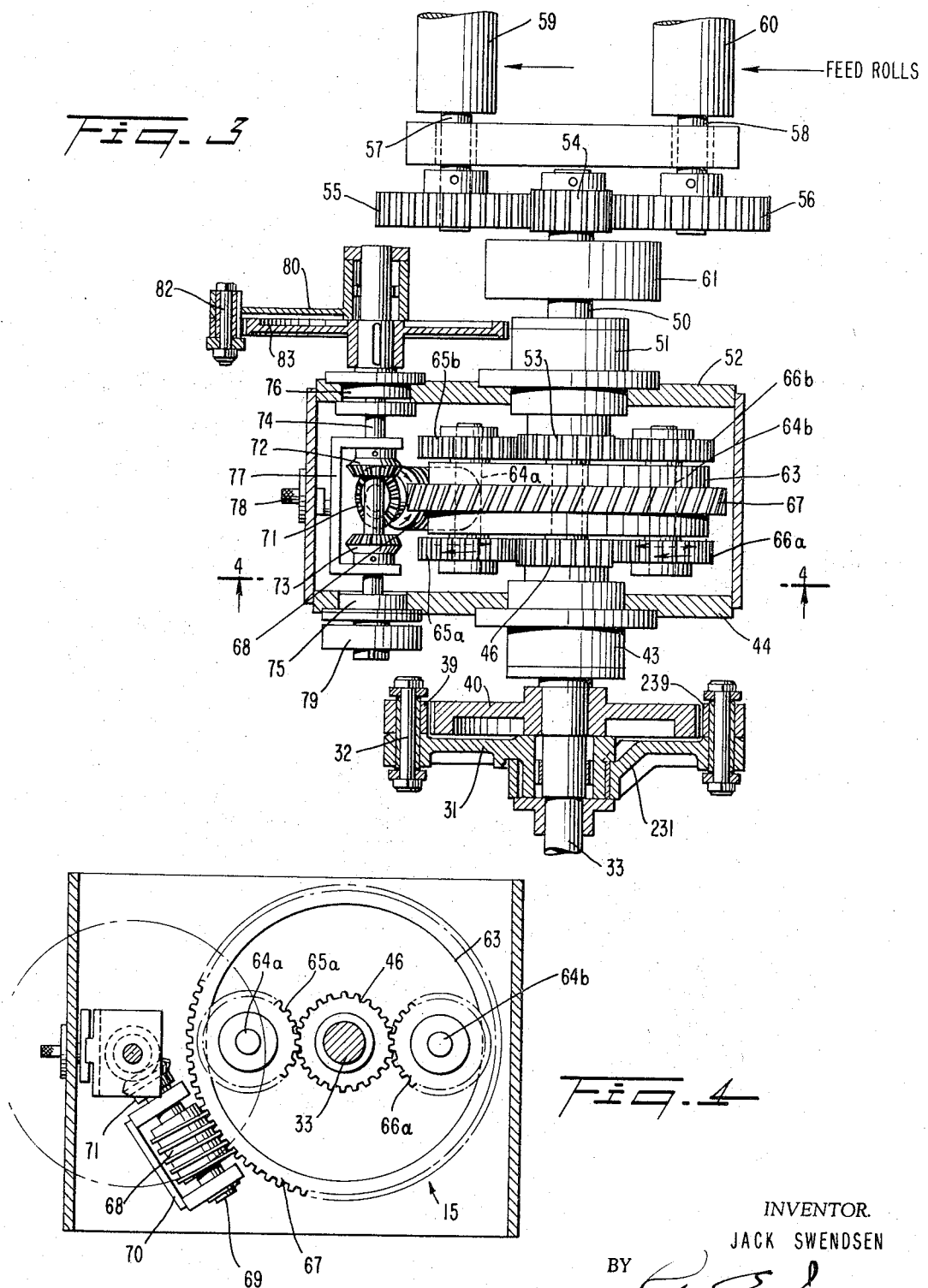

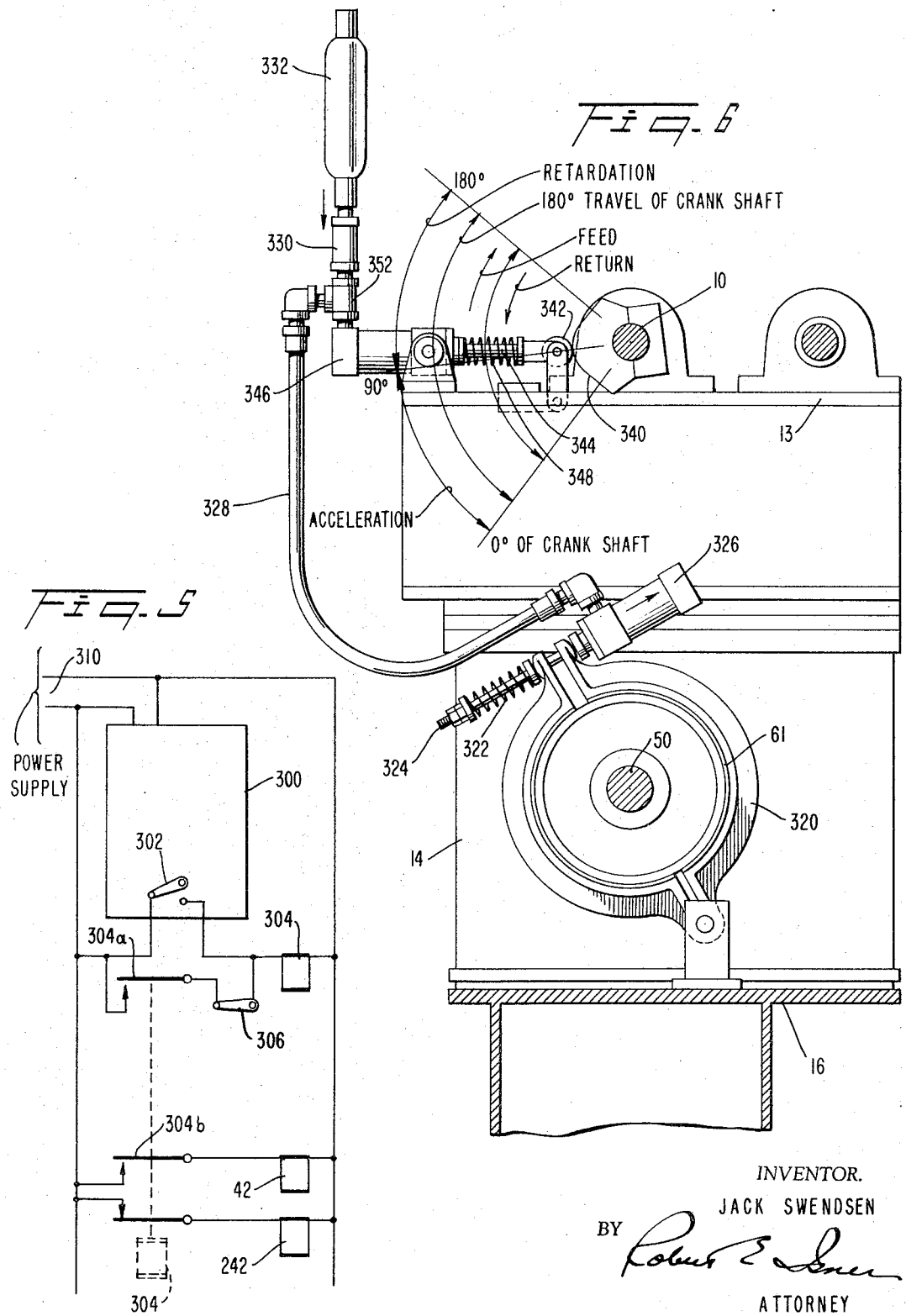

United States Patent Office 3,338,491
Patented Aug. 29, 1967

3,338,491
COARSE AND FINE ADJUSTMENT CONTROL
FOR STRIP FEEDERS
Jack Swendsen, Port Washington, N.Y., assignor to Wegner Machinery Corporation, Long Island City, N.Y., a corporation of New York
Filed June 17, 1965, Ser. No. 464,676
12 Claims. (Cl. 226—100)

This invention relates to material feed control devices and more particularly to devices for selectively controlling the degree of advance of sheet or strip-like material in apparatus for effecting repetitive incremental advance of said material for associated machine operations.

In the intermittent feed of sheets or strip-like material to machines that perform an operation thereon such as, for example, perforating, printing or cutting in the dwell period between successive advances thereof, it is highly desirable that the lengths of feed be accurately settable and that such settings be selectively effectable by the machine operator in a rapid and simple manner. The present invention is directed to this end and discloses apparatus whereby a machine operator may easily, rapidly and conveniently selectively preset the desired degree of material advance within a rather wide range of permissible values and with a markedly high degree of precision.

In its broad aspects the subject invention may be briefly described as including a pair of constant displacement drive members adapted to selectively feed the major and minor input means of a mechanical displacement integrating means with interposed coarse and fine control adjustment means to vary the amount of input to the integrating means in accord with a selectively desired degree of material advance and wherein said integrating means provides a common output of a magnitude proportional to the algebraic sum of the major and minor inputs thereto.

Among the objects of this invention is to provide, in a device of the class described, conveniently accessible and readily adjustable apparatus for selectively presetting a desired amount of material advance.

Another object of this invention is the provision of a simple and readily settable feed control device for sheet or strip like material having a markedly high degree of precision.

Still another object of the invention is the provision of a material feed control adapted to provide for a plurality of desired degrees of material advance and to sequence the same in preselectable order preparatory to initiation of machine operation and without interruption thereof thereafter.

Other objects and advantages will be apparent from the following portions of this specification and claims and from the appended drawings which delineate, by way of illustrative example and in accordance with the mandate of the patent statutes, a presently preferred embodiment of a material feed control device incorporating the principles of this invention and in which:

FIG. 1 is an elevational view of a device embodying the present invention;

FIG. 2 is an elevational view of the device as viewed from line 2—2 of FIG. 1;

FIG. 3 is a horizontal sectional view on line 3—3 of FIG. 2;

FIG. 4 is a view on line 4—4 of FIG. 3.

FIG. 5 is a schematic circuit diagram for effecting selective sequencing of a plurality of desired lengths of feed.

FIG. 6 is a schematic side elevation, partly in section, of an auxiliary brake control system forming a part of the subject invention.

Referring to the drawings, the specifically illustrated embodiment of the invention is designedly adapted for utilization in conjunction with a press wherein sheet or strip-like material is intermittently advanced, as by feed rolls 59, 60 (FIG. 3), from a roll or flat stock supply thereof to the operating elements of the press, such as dies or punch members. In accordance therewith, operative power for the material feed mechanism and for the selectively settable control device forming the subject matter of the invention herein is conveniently obtained from the drive system for the press and, by way of example, may suitably include a reciprocable connecting rod having its upper end connected through a crank 20 to an overhead main drive shaft 19.

Referring now to the embodiment of the invention as illustrated in FIGS. 1 and 2, there is provided a shaft 10 rotatably supported in a pair of spaced pillow blocks 11, 12, which are fixed to a support 13 secured to the top of a housing 14 for a mechanical displacement integrating means, such as a differential gearing mechanism 15 (see FIG. 3). The housing 14 is mounted on a base 16 which conveniently may be a part of the base for, or be connected to, the press or other machine for performing operations on the sheet or strip-like material. The end of the shaft 10 disposed exteriorly adjacent the pillow block 12 mounts a bell crank having one arm 17 thereof pivotally connected to the dependent end of the connecting rod 21, as at 23, and a second dependent arm 18 which, as will be pointed out hereinafter, is utilized to transfer the rotative displacement of shaft 10 to a second shaft 87 forming a part of the fine or vernier control system. As will be apparent from the foregoing, the shaft 10 is adapted to oscillate through a constant predetermined degree of angular displacement in response to the constant amplitude of reciprocatory displacement of the connecting rod 21.

Coarse control system

Mounted on the other end of the shaft 10 and disposed exteriorly adjacent to the pillow block 11 is a collar 24 having an extension arm that serves to support an elongate drive means, generally designated 25. In the illustrated embodiment, the drive means 25 is specifically in the nature of an elongate centrally fulcrumed lever member, perpendicularly secured to the extension arm by a plurality of bolts 26 and shaped, on one side thereof, to provide a supporting rail 27 for a displaceable slide member 28. The slide 28 is adapted to be selectively positionable intermediate the extremity and the fulcrum of the lever member 25 by means of an auxiliary fixed screw 98 rotatably mounted in a suitable bracket 99 attached to the end of the lever member 25 and threadedly engaged with said slide member 28. As is apparent, manual rotation of the screw 98 by the terminal knob 101 thereof effects selective displacement of the slide 28 longitudinally of the lever member 25 and, as will be explained hereinafter, varies the effective length of said lever member.

The slide 28 mounts a pivot pin 29 which in turn supports a bearing 30 disposed at the upper end of an elongate connecting link assembly, generally designated 97. The lower end of such link assembly is pivotally connected to the free end of an oscillatory lever arm 31 having its other end rotatably supported on the major input shaft means 33 for the differential gear integrating assembly.

In more detail, the link assembly 97 may include a rod 34 connecting the bearing 30 to a knuckle joint 35 which in turn engages with a stirrup-like member 36 having dependent straps 37 and 38 which carry the pivot pin 32. The pivot pin 32 also rotatably supports a pawl 39 positioned to drivingly actuate a ratchet wheel 40 keyed to the major input shaft 33 of the integrating means. The pawl is normally biased in driving engagement with the teeth of the ratchet wheel 40 by a spring 41 so that the ratchet wheel will be rotated clockwise, FIG. 2, each time the arm 31 and the pawl 39 is moved upwardly. For purposes which will be explained more fully hereinafter, the pawl 39 may selectively be displaced out of its ratchet engaging operating position by means of a solenoid 42 mounted on the arm 31.

The major input shaft 33 of the differential gear integrating means is journalled in a bearing 43 secured to a side wall 44 of the housing 14, and in a second bearing 45 at its outboard end. Rotation of the shaft 33 in response to rotative displacement of the ratchet wheel 40 effects concomitant rotation of the major input gear 46 fixed to the inboard end thereof.

In the specifically illustrated differential gear assembly, the major input shaft 33 is disposed in axial alignment with the output shaft means 50 thereof. Said output shaft 50 is journalled in a bearing 51 secured to the side wall 52 of the housing and in a second bearing (not shown) encircling the inboard ends of the major input and output shafts 33 and 50. The output shaft 50 carries an inboard gear 53 which is rotated by the hereinafter described differential gearing mechanism, and an outboard gear 54 which, by way of example, may mesh with gears 55 and 56 on the shafts 57 and 58, respectively, on which the material feed rolls 59 and 60 are mounted. A brake assembly 61 is included on the output shaft 50 for selectively resisting displacement thereof to insure that over-travel of the drive rolls is prevented.

The differential gearing mechanism 15 includes a spider 63 rotatably mounted on the bearings (not shown) surrounding the aligned inboard ends of the major input and output shafts 33 and 50. The spider supports a pair of bearing mounted planet shafts 64a and 64b having planetary gears 65a, 65b and 66a, 66b keyed thereto and arranged so that planet gears 65a and 66a mesh with the major input gear 46 and so that planet gears 65b and 66b mesh with the output gear 53.

As will be apparent from the foregoing, the degree of rotative displacement of the output shaft 50 (and hence of the material feed rolls 59 and 60) is, for any set position of spider 63, proportional to the amount of displacement of the input shaft 33 which, in turn, is determined by the degree of arcuate displacement of the oscillatory arm 31. The amount of arcuate displacement of the oscillatory arm 31 is selectively settable within predetermined limits by the selected positional disposition of the slide 28 on the lever member 25 as preset by the machine operator.

*Fine control system*

The fine or vernier control is effected by means of variation in the angular relationship between the planet shafts 64a and 64b relative to the major input and output shafts 33 and 50 introduceable through the minor input means to the differential gear system. Such arcuate displacement of the planet shafts 64a and 64b relative to the major input and output shafts 33 and 50 is effected by means of engagement between a peripheral worm gear 67 on the spider 63 and a drive worm 68 mounted on a stub shaft 69 journalled in a frame 70. The stub shaft 69 also carries a terminal bevel gear 71 selectively engageable by either one of two bevel gears 72 and 73 slidably mounted on a shaft 74 which serves as the minor input means for the illustrated differential gearing unit. The minor input shaft 74 is journalled in bearings 75 and 76 mounted to the side walls of the housing 14. The bevel gears 72 and 73 are shiftable axially by a slidably mounted yoke 77 which may be selectively positioned by rotation of a manually operable member carrying an eccentrically mounted pin 78 which engages a slot in the yoke. An auxiliary brake assembly 79 is included on the shaft 74 for selectively resisting displacement thereof to insure that over-travel is avoided.

Rotative displacement of the minor input shaft 74 is effected in a clockwise direction (FIG. 2) by the arcuate displacement of an oscillatory arm 80 rotatably mounted on the shaft 74 and by the engagement of a pawl 81 mounted on pivot pin 82 at the free end of the arm 80 with the ratchet wheel 83 keyed to the shaft 74. As was the case with the heretofore described coarse control system, the pawl 81 is normally biased into engagement with the teeth of the ratchet wheel 83 by a spring 84 and the assembly includes a solenoid 85 mounted on the arm 80 for selectively disengaging the pawl from the ratchet wheel whenever disconnection of the vernier control system is desired during the operation of the machine.

As now apparent, the above described drive for effecting rotation of the spider 63 provides for either addition or subtraction of the fine or vernier control. In the arrangement shown, with the bevel gears 73 and 71 engaged, the top of the worm gear 67 (FIG. 3) will move to the left or counterclockwise, FIG. 4, and the feed from the ratchet wheel 83 will subtract from the feed from the ratchet wheel 40. Whereas, when the bevel gear 72 is engaged with the bevel gear 71 the rotation of the worm gear 67 is in the opposite direction and the feed from the ratchet wheel 83 will add to the feed from the ratchet wheel 40.

The actuating mechanism for arcuately displacing the oscillatory arm 80 and for controlling the degree of displacement thereof for vernier control purposes is essentially similar to that heretofore described for the coarse control system. As illustrated, such mechanism includes a shaft 87 disposed parallel to the shaft 10 and rotatably supported in a pair of spaced pillow blocks 90 fixed to the support 13 on the top of the housing 14 for the mechanical integrating means. The shaft 87 is adapted to be rocked through a constant predetermined arc in unison with the shaft 10 by means of a link 91 connected intermediate the dependent arm portion 18 of the heretofore described shaft 10 bell crank and the dependent arm of a crank member 92 keyed to said shaft 87. Mounted on the end of the shaft 87 is a collar member 86 provided with an extension arm that terminally supports a second elongate drive means, generally designated 88, in the nature of a lever arm. The lever arm 88 is shaped to provide a supporting rail 93 for a displaceable slide member 94. The slide member 94 is rendered selectively positionable along the length of the lever arm 88 by the machine operator intermediate the terminal end and the fulcrum thereof by means of an auxiliary screw 106 rotatably mounted in a suitable bracket 109 and threadedly engaged with said slide member 94. As will be apparent, manual rotation of the screw 106 by means of the terminal knob 107 thereof effects selective displacement of the slide 94 longitudinally of the lever arm 88. In a manner similar to that heretofore described, the slide 94 mounts a pivot pin 95 which in turn supports the upper end of an elongate link assembly, generally designated 96, whose lower end is pivotally connected to the free end of the oscillatory arm 80 by means of the pivot pin 82.

Preparatory to describing the operation of the described unit, it should be noted that the fine control lever arm 88 could also be mounted on the shaft 10, thus affording a simplified structure that could dispense with the shaft 87, its mount and the linkage means for effecting displacement thereof in unison with said shaft 10.

As will also now be apparent from the foregoing, the selective positioning of the slide member 94 relative to the fulcrum of the lever member 88 controls the extent of arcuate displacement of the oscillatory arm 80 and hence of the extent of rotative displacement of the minor input shaft 74 to the integrating means, and such, in association with the amount of displacement afforded thereby relative to that afforded by the coarse control system, provides for an extreme selectivity of control.

Accuracy of feed control in the hereinabove described unit requires the effective minimization of inertially induced over-travel of the relatively massive rotative elements that are displaced during each cycle of operation.

In the illustrated cyclically operable drive system, the first half of each feed cycle, as would be effected by displacement of the crank from the 0° to the 180° position as illustrated in FIGURE 1, requires acceleration of the rotatable components from a zero velocity rest position at the start to maximum velocity at 90° and then a subsequent deceleration back to a zero velocity rest position at 180°. During the second half cycle of operation, i.e., from 180° to 0° the feed actuation members are returning to their start position and the rotative components remain in a rest or dwell position.

FIGURE 6 illustrates, by way of example, a suitable construction for a selectively actuable braking system to minimize over-travel by controlling the deceleration of the rotative components during the latter portion of the first half of the feed cycle. To this end, there is provided a displaceable brake band assembly, generally designated 320, disposed in encircling engagement with the brake drum 61 mounted on the output shaft 50 of the integrating unit 14. The brake bank 320 is normally biased into sufficient compressive engagement with the drum 61 to prevent backlash by the spring member 322 mounted on the piston rod extension shaft 324 of the hydraulic cylinder 326. The piston rod extension shaft 324 is adapted to be retracted in the direction indicated by the arrow by the introduction of hydraulic fluid into the cylinder 326 through conduit 328. The conduit 328 is connected through T coupling 352 and check valve 330 to hydraulic fluid reservoir 332.

Selective actuation of hydraulic cylinder 326 to increase braking resistance is effected by means of a selectively contoured cam 340 mounted on the arcuately displaceable shaft 10. A cam follower 342 mounted on the end of the piston rod 344 of a second hydraulic cylinder 346 is biased into engagement with the surface of cam 340 by means of the spring 348. The second hydraulic cylinder 346 is fluidly connected through coupling 352 to the first hydraulic cylinder 326 and to the hydraulic fluid reservoir 332.

In operation of the described unit, the brake band 320 is minimally engaged with the drum during the first 90° sector of travel of the crankshaft, during which time the rotative components are being accelerated from a zero velocity rest position to maximum velocity. As the crankshaft approaches its 90° position, the selectivity contoured surface of cam 340 initiates the displacement of the piston rod 344 to its advanced position with maximum displacement thereof being effected shortly after the 90° position of the crankshaft has been passed. Such piston rod displacement forces hydraulic fluid from cylinder 346 via T coupling 352 and conduit 328 into the hydraulic cylinder 326. The introduction of fluid into cylinder 326 effects retraction of the piston rod 324 thereof and an increase in braking engagement of the band 320 on the drum 61 to control the required deceleration forces normally attendant displacement of the crankshaft past the 90° position. As the crankshaft advances toward its 180° position the surface of the cam 340 is contoured to reduce braking pressure by permitting spring 348 to displace piston rod 344 to its retracted position with its consequent relief of pressure in hydraulic cylinder 326.

As now will be apparent from the foregoing, the described braking system is adapted to control the inertial effects inherent in the rotative components in the described system. That is to say, during the acceleration of the rotative elements braking pressure is minimally maintained and during deceleration braking pressure is increased in general proportion thereto. Such control action effectively results in the minimization, if not practical avoidance, of inertially induced over-travel of the rotative elements and thus materially contributes to the attaining of a high degree of precision in feed control.

Operation

In operation of the subject unit, the connecting rod 21 is adapted to provide a constant amplitude displacement which will be translated into a concomitant constant arcuate displacement of the shafts 10 and 87 and the drive means 25 and 88 mounted thereon. Under such condition, each of said lever-like drive means 25 and 88 is oscillated about its fulcrum through a predetermined sector once for each revolution of the main drive shaft 19. The degree of arcuate displacement of the major input shaft 33 of the integrating means, however, is dependent upon length of the stroke of the pawl 39 which in turn is dependent upon the linear distance between the pivotal center of the shaft 10 and the axis of the pivot pin 29 on the slide 28. As now apparent, this latter distance is selectively settable by the operator for obtaining different lengths of strokes of the pawl 39 to effect different angles of rotation of the ratchet wheel 40 and the major input shaft 33.

In a similar manner the degree of displacement of the minor input shaft 74 of the integrating means is dependent upon the degree of rotation tof the pawl 81 which in turn is dependent upon the location of the slide 94 relative to the fulcrum of the lever means 88. The degree of rotation of the output shaft 50 of the integrating means will be proportional to the algebraic sum of the displacement of the major and minor input shafts 33 and 74, respectively, and by a proper selection of component dimensions any desired degree of "coarse" and "fine" control can be afforded.

As a convenience to the operators in setting the position of the slides 28 and 94, respectively, the drive means are preferably provided with graduated scales 102 and 105, respectively, and the slides include indicating pointers 103 and 104, respectively.

By way of further illustrative example, the principles of the subject invention have been incorporated in a material feed for a press wherein a total range of incremental material advance of from 0 to 2.500" in settable increments of .001 is afforded and without adjustment from trial runs. Such unit includes lever like drive means 28 and 94 having an effective length of about 8.75 inches and 15" diameter ratchets (40 and 83) for the major and minor input shafts having 200 teeth and affording a maximum feed of 50 teeth at 90° of rotation. The differential gearing associated therewith was designed to effect a peripheral feed rool displacement of .050" for each one tooth advance of the ratchet 40 mounted on the main input shaft 33. In conjunction with the above, the differential gearing was also adapted to provide a peripheral feed roll displacement of .001" for each one tooth advance of the ratchet 83 mounted on the minor input shaft 74. In such a system the average distance on each of the scales 102 and 105 for each ratchet tooth is about .175".

Illustratively, if a feed length of .975 inch is desired in such unit such could readily be obtained by setting coarse control slide 28 to effect 1.000/.050 or a 20 tooth feed on ratchet 40 on major input shaft 33 and by setting fine control slide 94 for .025/.001 or a 25 tooth feed on ratchet 83 on minor input shaft 74. With the bevel gears arranged so as to effect a subtraction of the vernier or fine control, the output feed will effect 1.000–.025 or the desired .975" increment of advance. As is also apparent such settings would effect an incremental advance of 1.025" if the bevel gears were set for additional control rather than for subtraction.

Sequentially varying feed system

The subject construction readily includes means for effecting the sequenced feed of varying amounts of incremental advance of material. Such is readily effected by, as shown in the drawings, utilization of the other half of the drive means 25 for the coarse control system to provide for an alternate degree of advance for the ratchet 40 mounted on the major input shaft for the differential gear unit. There is provided a second slide member 228 selectively positionable intermediate the other terminal end of the member 25 and the fulcrum and an associated linkage system, generally designated 230, connected intermediate the slide and a second oscillating arm 231 rotatably supported by the main input shaft 33. Pawl 239 normally biased into operative engagement with the ratchet wheel 40 by a spring 241 is mounted on the arm 231. The oscillating arm 231 also mounts a solenoid 242 adapted, upon actuation, to effect disengagement of the pawl 239 from the ratchet. By means of the above, rotative displacement of the ratchet 40, and hence of the main input shaft 33, may be selectively effected either by the arcuate displacement of the oscillatory arm 31 or of the oscillatory arm 231 each in degree or amount determined by their respective slide settings, depending upon whether the pawl 39 or the pawl 239 is disposed in operative driving engagement with the aforesaid ratchet 40. Thus there is effectively provided two separate selectively settable degrees of major advance which can be utilized in any desired sequence by means of the solenoids 42 and 242 respectively.

FIGURE 5 illustrates a suitable control circuit for effecting the selective engagement and disengagement of the pawls 42 and 242 in accord with cyclic operation of the machine to which the material is being fed. There is provided a mechanical counter unit 300 driven from a cyclically operable element in the main machine and settable by the operator to effect momentary closure of switch 302 at a predetermined count. The momentary closure of switch 302 completes the circuit through the energizing coil 304 of a control relay energizing the same and effecting closure of contacts 304a to complete a holding circuit therefore through limit switch 306. The limit switch is adapted to be maintained closed during each feed stroke by means of a cam on the feeding mechanism, as for example on shaft 19 and to open after completion thereof.

Solenoid 42 is connected across the power supply 310 in series with normally open relay contacts 304b whereas solenoid 242 is connected across the power supply in series with normally closed contacts 304c. Under such condition solenoid 242 is normally energized and pawl 239 is disengaged from driving engagement with ratchet 40. Upon energization of the relay solenoid actuation is reversed, disengaging pawl 39 from ratchet 40, and engaging pawl 239 therewith for one feed stroke (or any predetermined number of feed strokes in accord with the reset mechanism of the counter), after which normal operation is resumed. By means of the above any sequence of feeds can be effected and further flexibility of operation can be obtained by modifications that will now be apparent to those skilled in this art.

Having thus described my invention, I claim:

1. A device for selectively controlling the degree of advance of material in apparatus for effecting repetitive incremental advance of said material for associated machine operation and including intermittently displaceable feed means in operative engagement with said material comprising;
   first drive means displaceable a predetermined amount,
   second drive means conjointly displaceable a predetermined amount,
   integrating differential gear means having individually displaceable major and minor input means and a displaceable output means connected to said feed means for effecting displacement thereof,
   the degree of displacement of said output means being proportional to the algebraic sum of the displacement of said major and minor input means,
   coarse control means connected intermediate said first drive means and said major input means and selectively positionable relative thereto for controlling the degree of displacement of said major input means independent of the predetermined amount of displacement of said first drive means and in accordance with a desired major increment of material advance and
   fine control means connected intermediate said second drive means and said minor input means and selectively positionable relative thereto for controlling the degree of displacement of said minor input means in accordance with a desired minor increment of material advance.

2. A device for selectively controlling the degree of advance of material in apparatus for effecting repetitive incremental advance of said material for associated machine operation and including intermittently displaceable feed means in operative engagement with said material comprising
   first lever means arcuately displaceable a predetermined amount about its fulcrum,
   second lever means conjointly arcuately displaceable a predetermined amount about its fulcrum,
   integrating means having individually displaceable major and minor input means and a displaceable output means connected to said feed means for effecting displacement thereof,
   the degree of displacement of said output means being proportional to the algebraic sum of the displacement of said major and minor input means,
   coarse control means connected intermediate said first lever means and said major input means and selectively positionable relative thereto for controlling the degree of displacement of said major input means in accordance with a desired major increment of material advance and
   fine control means connected intermediate said second lever means and said minor input means and selectively positionable relative thereto for controlling the degree of displacement of said minor input means in accordance with a desired minor increment of material advance.

3. The combination as set forth in claim 2 wherein said coarse control means includes a slide mounted on said first lever means and selectively spaceable from the fulcrum thereof.

4. The combination as set forth in claim 2 wherein said fine control means includes a slide member mounted on said second lever means and selectively spaceable from the fulcrum thereof.

5. The device as set forth in claim 1 including a third drive means displaceable a predetermined amount, a third control means connected intermediate said third drive means and said major input means and selectively positionable relative thereto for controlling the degree of displacement of said major input means in accordance with a desired major increment of material advance and means for selectively connecting said first or third control means to said major input means.

6. A device for selectively controlling advance of material in apparatus for effecting repetitive incremental advance of said material for an associated machine operation and including intermittently displaceable feed means in operative engagement with said material comprising
   first and second drive means conjointly displaceable predetermined amounts and selectively connectable in driving relationship with said displaceable feed means,
   means for effecting the selected connection of said first drive means in driving relationship with said displaceable feed means,
   first control means connected intermediate said first drive means and said means for effecting the selected connection thereof for controlling the degree of displacement of said displaceable feed means independent of the predetermined amount of displacement of said first drive means and in accordance with a first desired increment of material advance, means for effecting the selected connection of said second drive means in driving relationship with said displaceable feed means, second control means connected intermediate said second drive means and said means for effecting the selected connection thereof for controlling the degree of displacement of said displaceable feed means independent of the predetermined displacement of said second drive member and in accordance with a second desired increment of material advance and means for selecting the desired interconnection of said first and second drive means to said feed means.

7. The device as set forth in claim 1 including brake means for preventing over-travel of the output means of said integrating means.

8. In a feed controlling device for intermittently advancing material, the combination comprising differential gearing mechanism having a first input element, an output element in axial alignment with said first input element, and a second input element rotatable on the axis of said first input element and said output element; a follower shaft driven by said output element; brake means for repressing free rotation of said follower shaft; means for actuating said first input element, said actuating means comprising a ratchet wheel, an oscillatory arm, a pawl mounted on said arm, a lever arm, link means having pivotal connections with said lever arm and said oscillatory arm whereby said ratchet wheel and said first input element are actuatable intermittently by rocking movement of said lever arm; means for adjustably positioning the pivotal connection of said link means with respect to said lever arm so as to enable varying the stroke of said oscillatory arm and pawl; means for repressing free rotation of said first input element, means for actuating said second input element, said last-named actuating means comprising a second ratchet wheel, a second oscillating arm, a second pawl mounted on said second oscillatory arm, a second lever arm, link means having pivotal connections with said second lever arm and said second oscillatory arm, whereby said second ratchet wheel and said second input element are intermittently actuatable by rocking movement of said second lever arm; means for adjustably positioning the pivotal connection of said second link means with said second lever arm so as to enable varying the stroke of said second oscillatory arm and pawl; brake means for repressing free rotation of said second ratchet wheel and said second input element; and drive means for concomitantly operating said actuating means whereby to drive said output element and said follower shaft intermittently in proportion to the combined operative movements of said first and second ratchet wheels.

9. The combination set forth in claim 8 in combination with a scale on each of said first and second lever arms for measuring the linear distance extending from the center of pivot of a lever arm to the pivotal connection between the lever arm and the link means pivotally connected thereto, said scales respectively having graduations commensurate with definite increments of movement of said output element due to the distance of the location of said respective pivotal connections from the center of pivot of the respective lever arms.

10. The combination set forth in claim 8 in combination with alternative means for actuating said first-named input element, said alternative actuating means comprising a third arm mounted for oscillation about the axis of said first ratchet wheel, a third pawl carried by said third arm, said third pawl adapted for engagement with said first-mentioned ratchet wheel for actuating said first ratchet wheel, a third lever arm, third link means having pivotal connections with said third lever arm and said third oscillatory arm, means for adjustably positioning the pivotal connection of said third link means with said third lever arm lengthwise of said third lever arm for varying the stroke of said third pawl; means for operating said alternative actuating means concurrently with said first-mentioned lever arm; and means for preventing the engagement of one of said first and said third pawls with said first ratchet wheel when the other is operative to actuate said first ratchet wheel.

11. The combination set forth in claim 8 wherein said second input element includes a worm gear, and said means for actuating said second input element includes a worm engaging said worm gear, and means intermediate said second ratchet wheel and said worm for reversing, at will, the direction of rotation of said worm with respect to movements of said second ratchet wheel in one direction of rotation.

12. The device as set forth in claim 1 including selectively actuatable brake means responsive to the position of said drive means for controlling the rate of change of velocity of said output means to minimize over-travel thereof.

References Cited
UNITED STATES PATENTS

| | | | |
|---|---|---|---|
| 1,537,749 | 5/1925 | Colgrove | 226—115 |
| 2,095,125 | 10/1937 | Cornock | 226—32 |
| 2,514,261 | 7/1950 | Scheffey | 74—142 X |
| 2,800,327 | 7/1957 | Bandy | 226—188 X |
| 2,873,116 | 2/1959 | Lambert | 226—123 X |
| 3,119,537 | 1/1964 | Smits | 226—188 |
| 3,156,150 | 11/1964 | Sarka | 74—675 X |
| 3,199,373 | 8/1965 | Beale | 74—79 |

M. HENSON WOOD, Jr., *Primary Examiner.*

ALLEN N. KNOWLES, *Examiner.*